United States Patent
Bhalotia et al.

(10) Patent No.: US 7,552,128 B2
(45) Date of Patent: Jun. 23, 2009

(54) COMPRESSION OF TIMESTAMPS

(76) Inventors: Gaurav Bhalotia, 444 Castro St. Suite 109, Mountain View, CA (US) 94041; Janardhanan Kadirkamanathan, 444 Castro St. Suite 109, Mountain View, CA (US) 94041

( * ) Notice: Subject to any disclaimer, the term of this patent is extended or adjusted under 35 U.S.C. 154(b) by 329 days.

(21) Appl. No.: 11/698,576

(22) Filed: Jan. 25, 2007

(65) Prior Publication Data
US 2008/0183737 A1 Jul. 31, 2008

(51) Int. Cl.
*G06F 7/00* (2006.01)
(52) U.S. Cl. .......................... 707/100; 707/4
(58) Field of Classification Search ............... 707/1–5, 707/9, 10, 100, 101, 102
See application file for complete search history.

(56) References Cited

U.S. PATENT DOCUMENTS 6,598,051 B1 * 7/2003 Wiener et al. ............... 707/100
2003/0235325 A1 * 12/2003 Ray et al. .................... 382/100
2004/0125952 A1 * 7/2004 Alattar et al. ............... 380/202
2007/0136264 A1 * 6/2007 Tran ............................. 707/4

* cited by examiner

*Primary Examiner*—Wilson Lee
(74) *Attorney, Agent, or Firm*—Ash Tankha

(57) ABSTRACT

The method disclosed herein effectively caches timestamps in the memory of a query server. Each index file contains a base time and a set of documents with encoded timestamps. The base timestamp stored represents the index build time. The indexer encodes the timestamp of each document stored in the data directory. The difference of the absolute timestamp and the base timestamp is telescopically quantized into segmented time units. The compressed value of the segmented time units is stored in the index. During the querying process, the encoded timestamps for an individual document is recreated by applying a decoding process carried out in the query server. The reverse of the telescopic quantization is conducted to determine the absolute timestamp.

14 Claims, 6 Drawing Sheets

COMPRESSION OF TIMESTAMPS

BACKGROUND

This invention in general relates to a method and system of indexing documents for retrieval and specifically relates to a method and system for encoding timestamps.

Recently there has been a significant increase in rapidly changing content on the web in the form of news and blog articles. A dynamic web requires a highly responsive search engine. One of the important page attributes for search engines is the publishing date of the page, referred to as a timestamp. Timestamps reflect the creation and modification of a document. Given the massive size of the dynamic web with changing content that search engines have to deal with, and the response time that users expect, it becomes imperative that these timestamps be efficiently stored in the memory associated with the search engine.

FIG. 1 illustrates the working of a typical search engine. A query 101 is submitted to the query processor 102. For example, consider the search query "bird flu". The query processor generates the inverted index 104 and inverted attributes 105 as shown in the table 1 106, and table 2 107 and table 3 108. Documents 3 and document 5 contain the search words. The query processor gets the page attributes that determine the ranking of the documents retrieves the listed documents, and generates the ranked results 103.

To avoid bloating of the inverted index mentioned above, the attributes of the page such as timestamps, popularity, etc., are stored in a separate map indexed by document ID. This map typically is stored in memory for serving results to a large number of users at acceptable performance levels. In the current art, timestamps typically require a minimum of 3 bytes to store them over a 30 year span in granularity of minutes. It is estimated that around 10% of the web consists of dynamically changing content. To support such a massive repository size, reducing memory footprint as much as possible is desirable.

Thus, there is a need for a method and system for memory efficient encoding and decoding of timestamps. A smaller memory footprint for timestamps results in a lower implementation cost, improved scalability and faster search performance.

SUMMARY OF THE INVENTION

The news and blog pages or documents are ranked by recency or a combination of recency and query relevance. It has been observed that in any of these rankings, the time difference matters more when the documents are more recent, and gradually becomes less useful for older documents. For example, a document published five minutes ago is more relevant than a document published an hour or a day ago. However, for two documents published a year ago, a difference of hours or days does not contribute much to the difference in content relevance. The method and system disclosed herein takes into consideration the above non-linear time relevance of timestamps and thereby optimizes timestamp storage.

The method and system disclosed herein provides a compact and efficient storage and retrieval mechanism of documents in a network with frequently changing content.

The method of encoding of the timestamp disclosed herein allows timestamps to be cached in memory of the query server. Index of the documents is created for quick access to the relevant document during search process. The attributes of the documents such as timestamp, popularity are stored in a separate document map, indexed by document ID. The document map typically needs to be present in memory for serving results to a large number of users at acceptable performance levels. The absolute timestamp of a document represents the document creation or modification time. Every index has a base timestamp stored that represents the index build time. The indexer encodes the timestamp of each document stored in data directory. An original timestamp difference is calculated, wherein the original timestamp difference is equal to the difference between the absolute timestamp and the base timestamp. The original timestamp difference is telescopically quantized into segmented time units. A telescopic quantization is conducted to compress the original timestamp difference and the compressed value of the original timestamp difference is stored in the index. During the process of querying, the encoded timestamps for individual documents can be recreated by a decoding process carried out in the query server. The decoding process includes the reverse telescopic quantization, multiplying with time unit factors, and then subtracting the extracted timestamp differences from the base timestamp. The reverse of the telescopic quantization is conducted to decompress the compressed value of the original timestamp difference and obtain the extracted timestamp difference. The extracted timestamp difference is obtained by multiplying the compressed original timestamp difference value by a time unit factor. The absolute timestamp for the document is further obtained by subtracting the extracted timestamp difference from the stored base timestamp.

These and other objects and advantages of the method and system of the present invention will be appreciated in light of the claims, detailed description and drawings.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary methods and systems of the invention; however, the invention is not limited to the specific methods and instrumentalities disclosed herein.

DETAILED DESCRIPTION OF THE INVENTION

Figure 2:
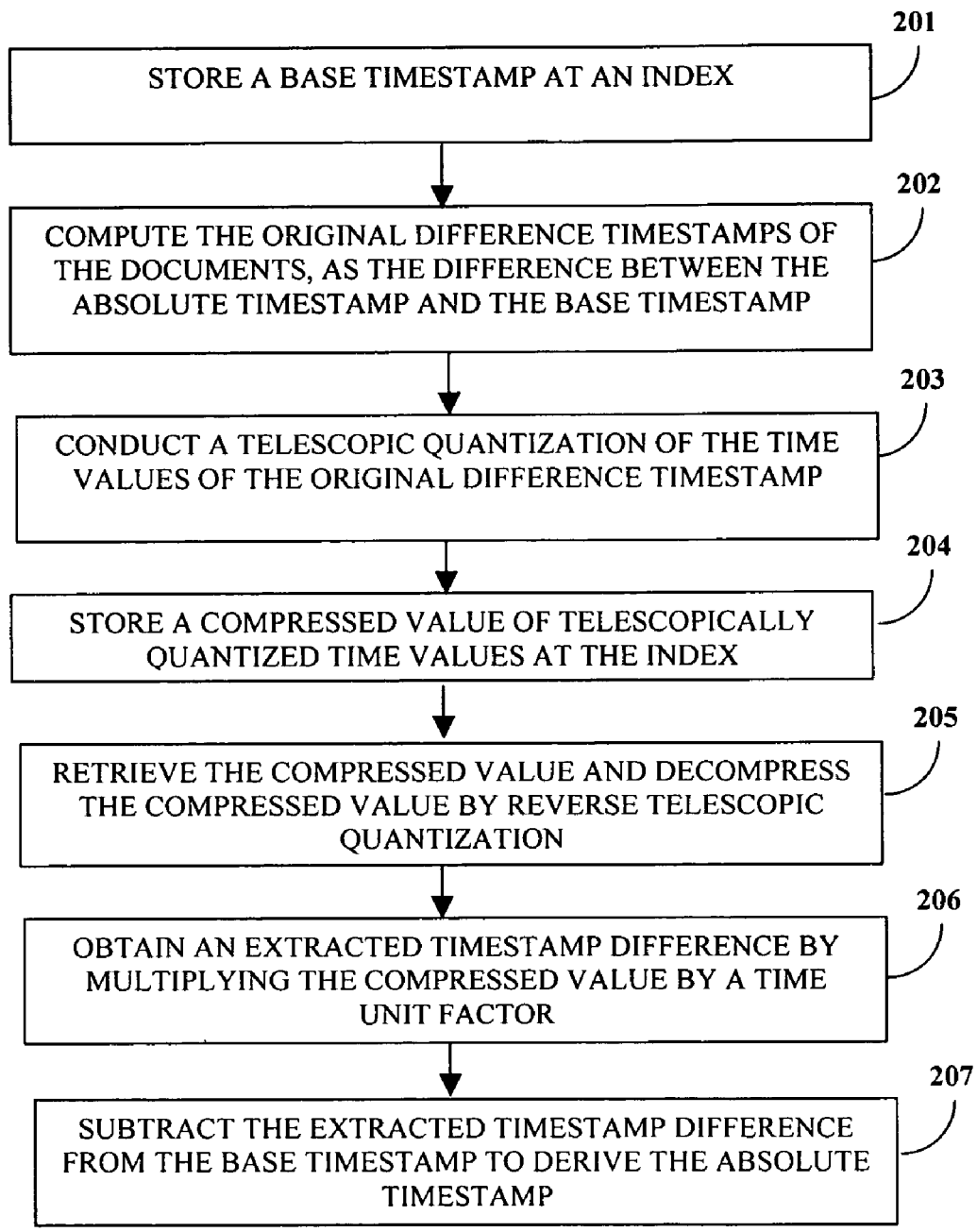
FIG. 2 illustrates the method of encoding of timestamps and caching in memory.

FIG. 2 illustrates the method of encoding of timestamps and caching in memory. FIG. 2 illustrates a method of encoding the timestamps of indexed web documents stored in the data directory.

The method disclosed herein effectively caches timestamps in the memory of a query server. The attributes of documents such as timestamp and popularity are stored in a document map indexed by a document identifier (ID). The document map maps document identifiers to a set of document attributes such as timestamp and popularity. This document map is utilized to serve search results to a large number of users at acceptable performance levels. Each index file contains a base time and a set of documents with encoded timestamps.

The method of encoding timestamps and caching in memory comprises the following steps. Store a base timestamp at an index, wherein base timestamp is the index build time 201. Compute the original timestamp differences of the documents, wherein the original timestamp difference is equal to the difference of the absolute timestamp from the base timestamp 202. Conduct a telescopic quantization of the original timestamp difference resulting in segmented time units 203. In the phrase "telescopic quantization" used in the above sentence, the word "telescopic" refers to a graded scheme of organizing the quantized values. Store a compressed value of telescopically quantized time values at the index 204. Retrieve the compressed value and decompress the compressed value by reverse telescopic quantization, wherein the step of retrieving is initiated in response to a search query 205. Obtain the extracted timestamp difference by multiplying the compressed value of the original timestamp difference by a time unit factor 206. Subtract the extracted timestamp difference from the base timestamp to derive the absolute timestamp 207.

Figure 3:
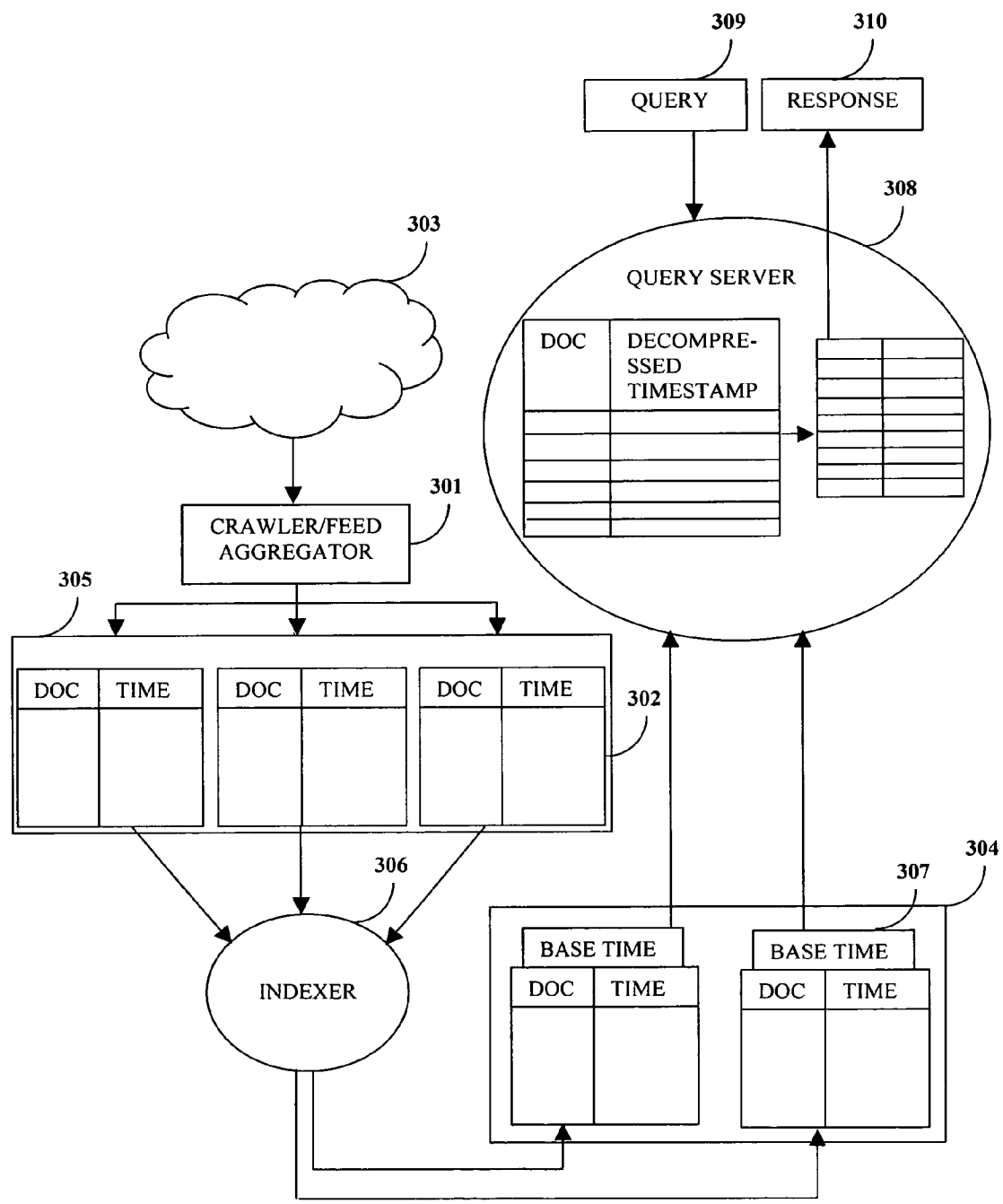
FIG. 3 illustrates the system that provides selected documents from a set, in a time sensitive order to queries.

FIG. 3 illustrates the system that in response to a search query, provides selected documents from a data directory in a time sensitive order. The system consists of a crawler 301 that fetches documents 302 and stream of document 305 from the network 303 and stores the main system files in a data directory 304. A crawler, also called a feed aggregator processor 301 fetches the files at regular intervals and produces a stream of document 305 entries that includes the creation time of the document 302. The indexer 306 receives the stream of documents 305 with timestamps. The indexer 306 encodes the difference between the absolute timestamp and the base timestamp 307 of the current index for each document in the document stream 305. The difference of the absolute timestamp and the base timestamp 307 is the original timestamp difference. The original timestamp difference is compressed using telescopic quantization and stored in the data directory 304. In response to an input query 309, the query server 308 decompresses the compressed timestamp value of the document using reverse telescopic quantization. The decompressed value combines with the first two significant time units of the base timestamp 307 to determine the extracted timestamp difference. The absolute timestamp is obtained by subtracting the extracted timestamp difference from base timestamp 307. Finally, after considering the absolute timestamp values for ranking by recency, the query server generates the ranked response 310 for the given query 309.

Timestamp encoding entails the following two processes. The first process that includes encoding and compression, implemented by the indexer, encodes the difference between a base timestamp 307 and a set of timestamps associated with documents that are targets of time sensitive queries.

The second process that includes decoding and decompression of every selected document, is implemented in the query server. The query server orders the selected documents based on their associated timestamps.

The method of encoding and compression disclosed herein is implemented in three levels. Typically, for news and blog articles, users are interested in the relative recency of news and blog articles but are generally not interested in the actual publication date.

At the first level, original timestamp differences, i.e., the differences between the absolute timestamp and the base timestamp are stored. Each index also stores a base timestamp 307, i.e., stores the index build time. Timestamps for individual documents are recreated at query time by subtracting the stored extracted timestamp differences from the base timestamp 307.

At the second level, only the top two significant time units are stored. This is achieved by splitting the original timestamp difference as obtained above into the following time units—year (Y), month (M), day (D), hour (H) and minutes (M). The first two significant time units of the original timestamp difference are stored, resulting in four possible combinations for the unit of the time difference such as year month (YM), month day (MD), day hour (DH), hour month (HM). The entire timestamp is stored in a single byte. The time unit combination is stored in two bits and the original timestamp difference value is stored in the remaining 6 bits.

At the third level, the time values are telescopically quantized. The organization of the quantized time values is exemplified by the following graded scheme. There are six bits left to store the two most significant time elements of the timestamps. Depending on the combinations the following distinct values are needed: 30=Year, 12=Month, 31=Days, 24=Hours, 60=Minutes. Based on the combinations, the values that need to be stored are as follows: year month (YM)=>360, month day (MD)=>372, day hour (DH)=>744, hour month (HM) =>1440. Hence, 1440 values using 64 sections (6 bits) are stored using telescopic quantization as illustrated in FIG. 4.

The pivot date is the index build time, i.e. the pivot data may be Nov. 1, 2006:20:30:15. In this case, the date Nov. 15, 2006: 00:00:00 will be stored as the time value 13 days, 3 hours and 30 minutes(13 D, 3 H, 30M). The above time value is stored as a DH unit combination, enumerated as 13 D, 3 H, and represented by the number (13×24)+3=315. (please note this is different from what you provided: 13*3=39.)

This entire time value is to be stored in 1 byte, i.e. in 8 bits. Since there are four time unit combinations, there is a need for 2 bits for storage of the time unit combination information. This leaves 6 bits for storage of the time value. In 6 bits, 64 values can be stored, corresponding to 64 sections. Therefore depending on unit combination type, i.e. YM, MD, DH or HM, the time values, i.e. the 360, 372, 744 or 1440 values are mapped to above mentioned 64 sections.

Figure 4:
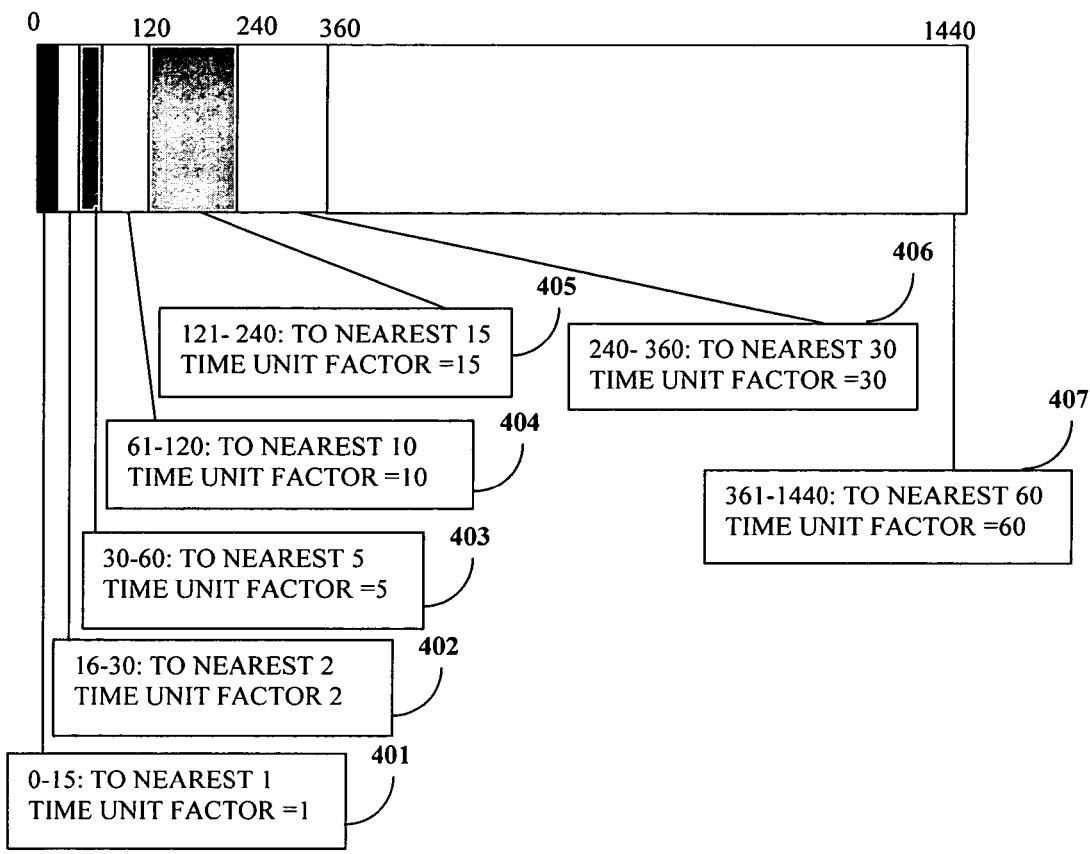
FIG. 4 illustrates telescopic quantization of the time values.

FIG. 4 exemplarily illustrates telescopic quantization. The segments 401 to 407 show exemplary approximations of time values. The HM time unit requires the mapping of 1440 time values to 64 sections. In this example, each of the time value corresponds to 1 minute. The mapping of time values into sections depends on the time unit factor. For time values less than 16 minutes (i,e. 0 to 15 minutes), the time values are mapped into sections with a 1:1 correspondence as shown in segment 401. The segment 401 has a time unit factor of 1. Hence, segment 401 consists of 16 sections representing the first 16 time values. For time values between 16 and 30 minutes, time values are rounded off to the nearest 2 minutes in segment 402, these time values occupy the next 7 sections. These seven sections represent the next 14 time values (16-30 minutes). The segment 402 has a time unit factor of 2. For time values between 31 and 60 minutes, time values are rounded off to the nearest 5 minutes in segment 403, thus occupying next six sections. These six sections represent the next 30 time values. The segment 403 has a time unit factor of 5. Similarly the segments 404, 405, 406 and 407 have time unit factors of 10, 15, 30 and 60 respectively. The segments 404, 405, 406 and 407 occupy the next 6, 8, 4 and 18 sections respectively.

For example, the time value 15 H 01 M would be stored as: 15 H 01 M=901 M, and this time value falls within the 361-1440 telescopic segment 407. The total number of sections assigned for the previous time values i.e the time values from 0-360 is 47 i.e (16+(30−16)/2+(60−30)/5+(120−60)/10+(240−120)/15+(360−240)/30)=47. The time value at the beginning of the $48^{th}$ section is 361.

Hence, the value assigned to $15H\,01M =$ $$47 + (901 - 361)/60 \text{ rounded down} = 47 + 9$$

Compressed original timestamp difference = 56.

The decompressed value of the above compressed timestamp is obtained by applying the reverse quantization for the quantized value. For example, the above quantized value 56 is decompressed as follows:

Subtract the quantized value 56 from the number of sections occurring prior to the quantized segment 407, i.e subtract 47. The difference obtained by the subtraction is multiplied by 60, i.e. the time unit factor associated with the quantized segment 407. In this example, the time unit factors for the segments 401, 402, 403, 404, 405, 406 and 407 are 1, 2, 5, 10, 15, 30, and 60 respectively. The previous 47 sections comprised in the segments 401-406 encompass the remaining 361 time values. Hence, these 361 time values are added to the product obtained above to derive the extracted timestamp difference.

$$\text{Hence, the decompressed value} = [(56-47) \times 60] + 361$$
$$= 901\,M$$

Extracted timestamp difference = $15\,H\,01\,M$

The size of the various telescopically quantized segments, i.e. the gradation scheme of the telescopically quantized time values, can be changed depending on the accuracy required. For example, if greater accuracy is desired for smaller numbers, the first few sections (0-15, 16-30) are made larger by merging them in to one section of 0-30. Out of 64 numbers, 30 numbers have already been assigned. Therefore, only 34 numbers need to be assigned for the time values from 30-1440.

The accuracy level can be altered in the above exemplary application of the telescopic quantization of timestamps. For example, the method disclosed herein can be applied over a year or over a month to get accuracy in the order of seconds or micro-seconds.

In another embodiment of the invention, referring to an adaptive telescopic compression scheme, different quantization for each of the combinations is conducted to achieve a higher level of accuracy.

Decompression is conducted in three levels. In the first level, the query server retrieves the value of compressed timestamp(s). The compressed original timestamp difference is stored in the least significant six bits. These six bits are decompressed into a number between 0 and 1440 using the reverse process of telescopic quantization. In the second level, the extracted timestamp difference is obtained. The top two significant time units are obtained from the first two bits of the base timestamp. The extracted timestamp difference is obtained by multiplying the compressed original timestamp difference obtained in the first level by a time unit factor, signified by step 206 of FIG. 2. This time unit factor depends on the scale of the original timestamp difference. For example, if the original timestamp difference under consideration is in the unit combination type-year month(YM), the time unit factor is a function of YM and the mapping of time values to the telescopically quantized segments.

In the third level, the absolute timestamps are obtained. The extracted timestamp difference, obtained in the second level is subtracted from the base timestamp 307 stored in the index to obtain the absolute timestamps for the document.

Figure 5:
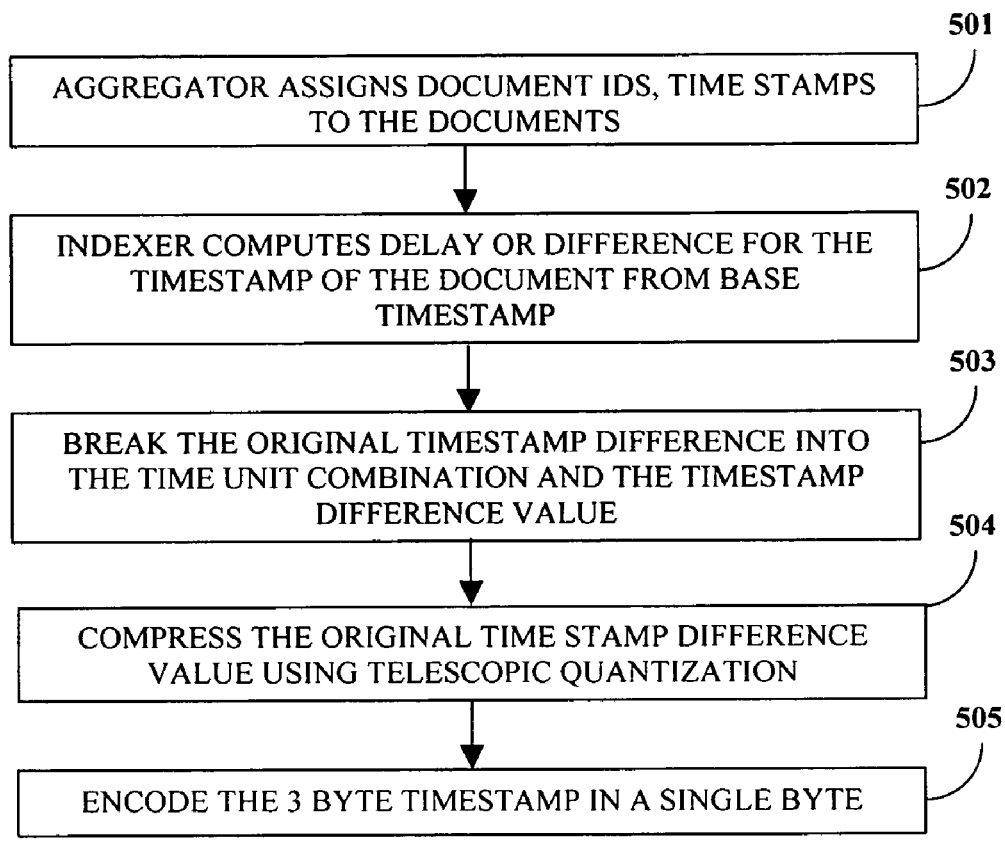
FIG. 5 illustrates the process carried out by the indexer.

The compression preserves the monotonicity of timestamps. Depending on the closeness of two consecutive timestamps, the indexer buckets timestamps together in the compressed space, but the timestamps never cross each other. Time stamps never cross each other as they maintain monotonicity: i.e. if timestampA>timestampB then compressedTimestampA>compressedTimestampB FIG. 5 illustrates the process carried out by the indexer. The figure illustrates the steps of telescopic quantization and compression process carried out by the indexer. The feed aggregator 301 assigns a document identification number (doc ID) and a timestamp 501 for the each of the document available in the document stream 305. The indexer 306 computes the difference from the base timestamp 307, 502 and the process is carried out at regular intervals of time, i.e., for each refresh period. The original timestamp difference is broken into the time unit combination and the timestamp difference value 503. The original timestamp difference value segments are compressed using telescopic quantization 504, and encoded in a single byte 505.

Figure 6:
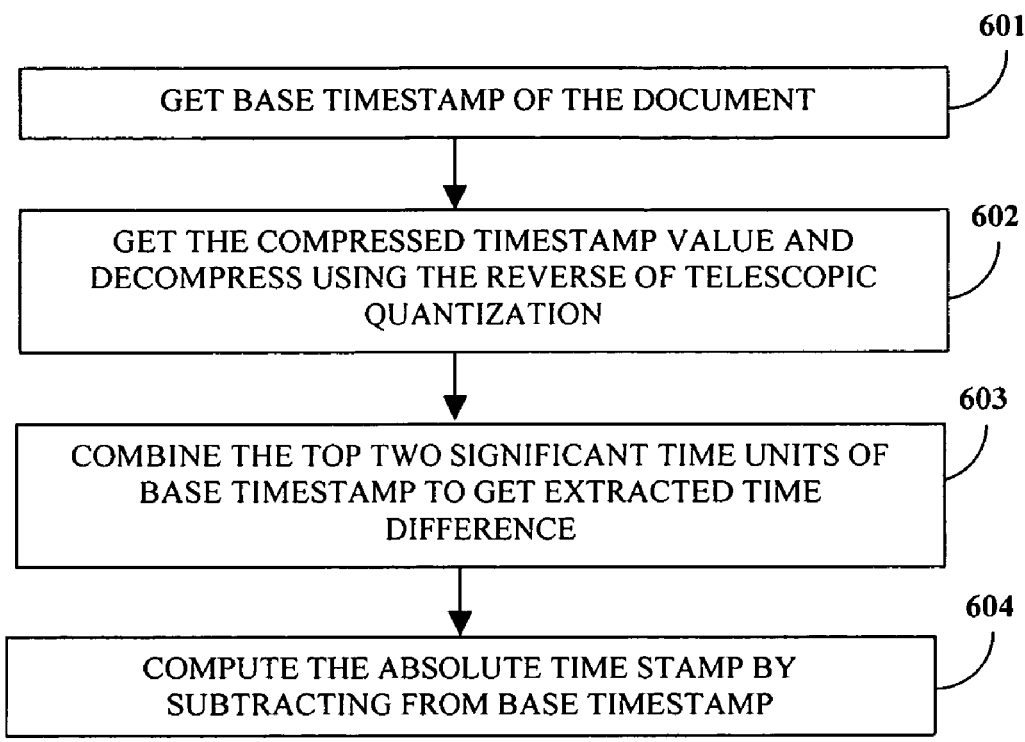
FIG. 6 illustrates the steps carried out by the query server.

FIG. 6 illustrates the steps of decompression carried out in a query server. The query server gets the base timestamp 307, 601. The compressed timestamp value segments are decompressed using reverse telescopic quantization 602. The significant time and value segments are combined with top two significant time units of the base timestamp to derive at the extracted timestamp difference 603. The absolute timestamp is computed by subtracting the extracted timestamp difference from the base timestamp 604.

The present invention has been described in the context of encoding and decoding timestamps. However, it will be appreciated by those skilled in the art that the same method of coding and encoding of timestamps can be applied to any electronic document, and is not restricted to web based content. The searchable data may include database contents, file system contents, web page contents, web crawler information, and other types of electronic documents. The electronic documents could be of one of more of the following modes, such as text, visual, audio etc.

The present invention has been described in the context of a web environment. However, it will be appreciated by those skilled in the art that the method and system disclosed herein can be applied to electronic documents that are stored in one or more, or a combination of the following locations: internet, intranet, local area network, a file system in a local computer terminal, etc.

Figure 1:
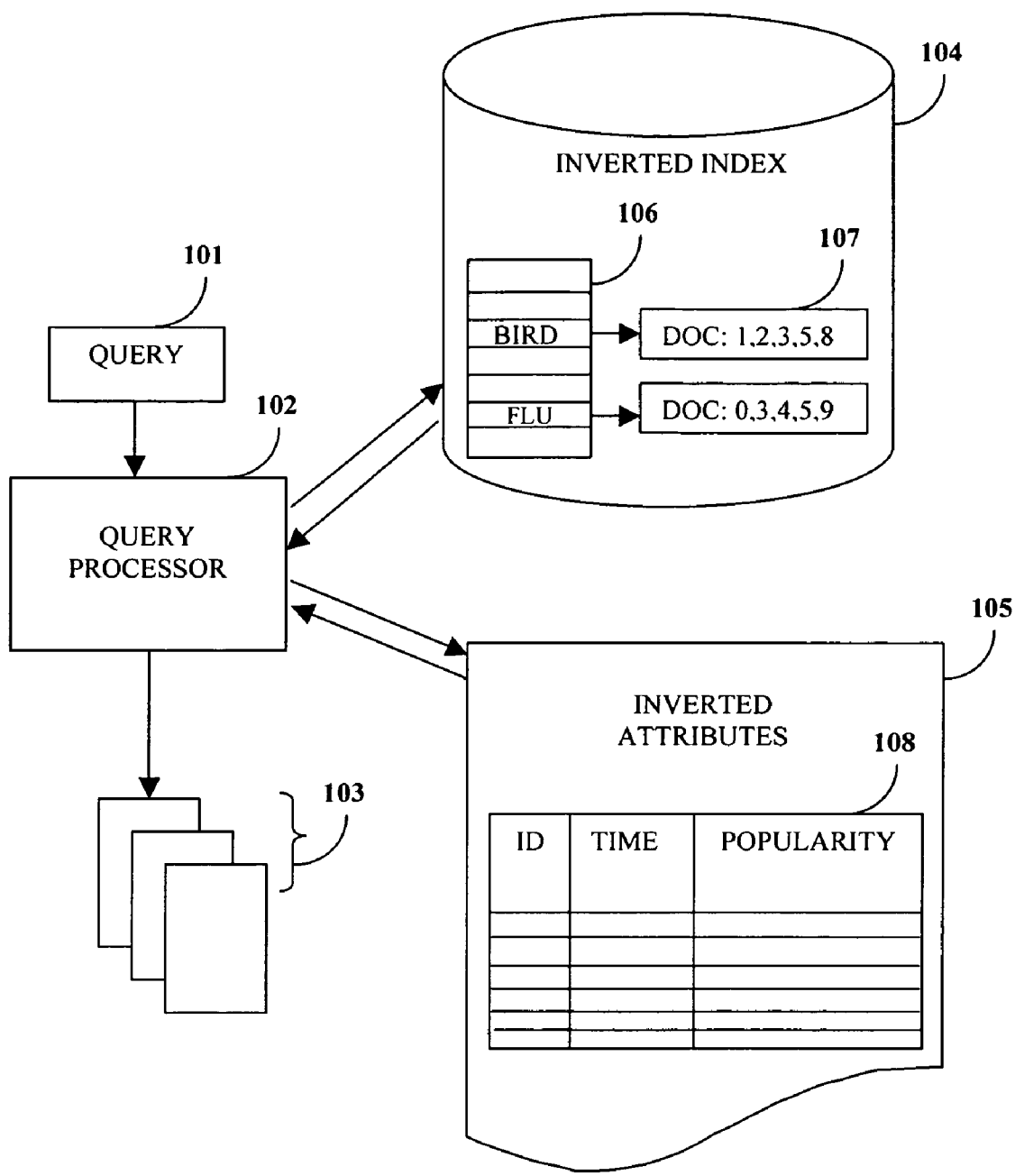
FIG. 1 illustrates the working of a typical search engine.

Although the processes described in FIG. 1 appears to be centralized, it will be appreciated by those skilled in the art that the same processes can be applied in a distributed computing environment.

The method and system described herein is not necessarily limited to processing timestamp related data, it can be applied to data that has the following two features. First, a pivot value can be established for the data; for example, by setting the current time value for time related data. The data is stored as differences from this pivot value. Second, the various units of data can be set at differing levels of accuracy, for example, the accuracy level is set at year, month, etc.

For example, the method and system described herein can be applied to compress money data. Consider the need to store the changing prices of an item. The price at calendar year 2000 is fixed as the pivot point. The price data is stored as a difference from the pivot value. The gradations in accuracy comprise cents, dollars, hundreds, thousands and millions of dollars.

For example, the method and system described herein can be applied to compress length data. In a geographical mapping application, there is a need to store distances of a business from a city center. The home address may be fixed as the pivot point. The length data is stored as a difference from the pivot value. The gradations in accuracy comprise feet, yards, miles etc.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method of managing timestamps for documents, wherein said managing timestamps comprises encoding, compressing, decoding and decompression of said timestamps, further comprising the steps of:
   storing a base timestamp at an index, wherein said base timestamp is the index build time;
   computing the original timestamp differences of said documents, wherein said original timestamp difference is equal to the difference of the absolute timestamp from the base timestamp;
   conducting a telescopic quantization of said original timestamp difference and storing a compressed value of said telescopically quantized time values at the index;
   retrieving said compressed value and decompressing the compressed value by the reverse of said telescopic quantization, wherein said step of retrieving is initiated in response to a search query;
   obtaining an extracted timestamp difference by multiplying the compressed value by a time unit factor; and
   subtracting said extracted timestamp difference from said base timestamp to derive the absolute timestamp.

2. The method of claim 1, wherein the value derived from said step of decompressing said compressed value is combined with the first two significant time units of the base timestamp to determine the extracted timestamp difference.

3. The method of claim 1, wherein said managing of timestamps maintains the monotonicity of timestamps.

4. The method of claim 1, wherein the accuracy level for storage and retrieval of timestamp can be altered by varying the levels of telescopic quantization of timestamps.

5. The method of claim 1, wherein said documents comprise database contents, file system contents, web page contents, web crawler information, and other types of electronic documents.

6. The method of claim 1, wherein said documents comprise electronic documents in a plurality of communication modes, further comprising text, audio and video electronic files.

7. The method of claim 1, wherein said documents are accessed from one or more of the following locations: the internet, intranet, local area network or a file system in a local computer terminal.

8. A system for providing selected documents from a set of documents, in a time sensitive order to queries, comprising:
   a memory for storing computer readable instructions, when executed by a processor, providing
      a crawler that fetches said set of documents and document lists, and stores them in system files in a data directory;
      a feed aggregator that inputs said system files, and at regular intervals produces a stream of document entries with details including its absolute timestamp;
      an indexer that receives said stream of documents with absolute timestamps, and conducts the steps of,
         storing a base timestamp at an index, wherein said base timestamp is the index build time; of the document computing the original timestamp differences of said documents, wherein said original timestamp difference is equal to the difference of the absolute timestamp from the base timestamp;
         conducting a telescopic quantization of said original timestamp difference and storing a compressed value of said telescopically quantized time values at the index;
   a query server that serves a query and presents a response to said query in the form of said selected documents from said set of documents, based on the recency of the documents found by the query, wherein said recency of the documents is determined by the calculation of the absolute timestamp, comprising the steps of,
      retrieving said compressed value and decompressing the compressed value by the reverse of said telescopic quantization, wherein said step of retrieving is initiated in response to a search query;
      obtaining the extracted timestamp difference by multiplying the compressed value by a time unit factor; and
      subtracting said extracted timestamp difference from said base timestamp to derive the absolute timestamp.

9. The system of claim 8, wherein the value derived from said step of decompressing said compressed value is combined with the first two significant time units of the base timestamp to determine the extracted timestamp difference.

10. The method of claim 8, wherein said step of managing of timestamps maintains the monotonicity of timestamps.

11. The method of claim 8, wherein the accuracy level for storage and retrieval of timestamp can be altered by varying the levels of telescopic quantization of timestamps.

12. The system of claim 8, wherein said documents comprise database contents, file system contents, web page contents, web crawler information, and other types of electronic documents.

13. The system of claim 8, wherein said documents comprise electronic documents in a plurality of communication modes, further comprising text, audio and video electronic files.

14. The system of claim 8, wherein said documents are accessed from one or more of the following locations: the Internet, intranet, local area network or a file system in a local computer terminal.

* * * * *